Sept. 25, 1962     J. J. SHUK ET AL     3,055,391

VALVE

Filed June 16, 1959

United States Patent Office 3,055,391
Patented Sept. 25, 1962

3,055,391
VALVE
John J. Shuk, Bridgeport, and Donald R. Wilson, Newtown, Conn., assignors to Jenkins Bros., Bridgeport, Conn., a corporation of New Jersey
Filed June 16, 1959, Ser. No. 820,707
2 Claims. (Cl. 137—516.25)

This invention relates to valves and, more particularly, to ball check valves.

It is an object of this invention to provide an improved ball check valve capable of operating for prolonged periods without requiring maintenance operations or the replacement of parts.

It is a further object of the invention to provide an improved ball check valve which is substantially self-cleaning and which operates to remove foreign matter which might accumulate in conventional types of ball check valves.

Another object of the invention is to provide an improved ball check valve which is capable of being manufactured by mass production techniques despite the fact that the above indicated objectives are concomitantly achieved.

Another object of the invention is to provide an improved ball check valve especially suited for industrial piping systems and which is adapted for maintaining proper flow conditions.

In conventional ball check valves, a ball is generally provided in operative association with a guide. This guide provides a body to which foreign matter may attach and generally is an element requiring maintenance and replacement. Furthermore, this guide interferes with the natural movement of the associated ball and causes the same to wear, this wear sometimes being uneven and thus constituting a further source of difficulty.

The invention therefore contemplates the provision of an improved ball check valve which is completely devoid of structural guides and equivalent elements and in which a ball is suspended in the fluid being controlled, the structure of the valve being adapted for maintaining proper flow conditions and being well adapted for terminating flow as may be required.

Other objects of the invention, as well as advantages and features thereof, will be apparent from the following detailed description of a preferred embodiment as illustrated in the accompanying drawing, in which.

Figure 1:
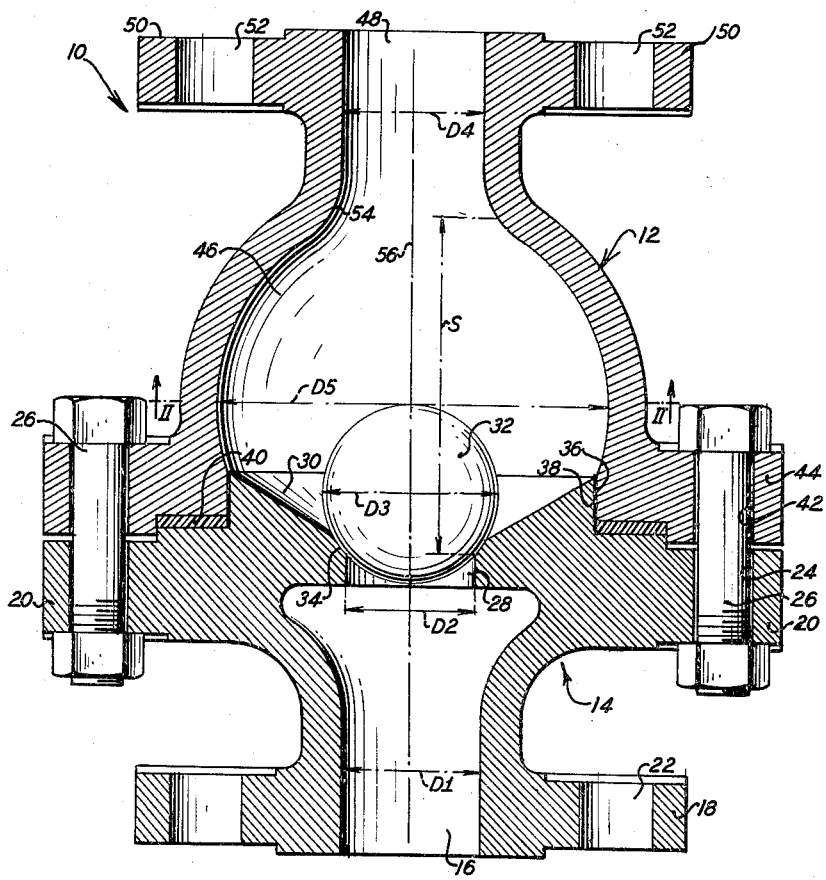
FIG. 1 illustrates in axial section a ball check valve embodying the features of a preferred embodiment of the invention.

The illustrated valve 10 comprises a body preferably consisting of an upper section 12 and a lower section 14. Lower section 14 defines an inlet conduit 16 having a diameter D1 and is provided with a lower flange 18 and an upper flange 20. Lower flange 18 is provided with holes 22 by means of which section 14 is connected with an inlet pipe (not shown) and flange 20 is provided with holes 24 which, by means of, for example, bolts 26, enable the engagement of section 14 with section 12.

Diameter D1 can be independent of the diameter D2 of section 28 of the inlet conduit, and it is diameter D2 with which the design of the structure hereinafter indicated is primarily concerned.

It will be noted that section 14 defines a seat 30 which flares upwardly from inlet conduit section 28 or conversely tapers downwardly to said section. Seat 30 is the ball seat for the valve 10 and serves to accommodate ball 32 which tends to assume, under the influence of gravity, a position against the lowermost portion 34 of seat 30 whereat the inlet conduit is blocked. Ball 32 has a diameter D3.

Upper section 12 is provided with shoulder 36 which matingly engages shoulder 38 of lower section 14. A gasket 40 may be provided between these shoulders which are locked together by means of bolts 26 which pass through holes 42 in flange 44 of upper section 12.

Upper section 12 defines an enlarged chamber 46. Preferably the major portion of chamber 46 has the configuration of a sphere so as to correspond with the configuration of ball 32. With sections 12 and 14 locked together, the diameter of chamber 46, at the lowermost portion thereof, corresponds to the largest diameter of conical seat 30 so that the seat and chamber merge together. At its upper extremity, chamber 46 merges with an outlet conduit 48 defined by upper section 12. Upper section 12 is provided with a flange 50 which, by means of holes 52, may be connected with an outlet pipe (not shown).

Chamber 46 merges smoothly with outlet conduit 48 and tapers or converges into the outlet conduit 48 as indicated at section 54.

Outlet conduit 48 has a diameter D4 which is, to an extent, independent of diameter D2. It is imperative, however, that diameter D4 be smaller than diameter D3 of ball 32, or conversely that the ball 32 have a diameter which is greater than that of outlet conduit 48. This insures that ball 32 cannot escape via the outlet conduit.

As noted above, chamber 46 is preferably spherical. In fact, chamber 46 need not be spherical but, in the preferred embodiment, this chamber is spherical and has a maximum diameter D5. This diameter and its relationship with ball 32 is indicated more clearly in FIG. 2. The diameter of chamber 46 is preferably from 2¼ to 2¾ times diameter D3 of ball 32. Other dimensions will provide operative structures, but the indicated ratio gives a preferred type of action.

As will be noted, section 28 of inlet conduit 16, seat 30, chamber 46 and outlet conduit 48 are all symmetrical about a common vertical axis 56. Outlet conduit 48 is vertically aligned with section 28 of inlet conduit 16 and is spaced therefrom by chamber 46 and seat 30. This spacing, which is distance S, is the effective height from the lowermost portion 34 of seat 30 to the portion 54 at which ball 32 would contact upper section 12 if displaced to a position at which outlet conduit 48 would be blocked. Distance S is preferably about 2 to 2½ times diameter D3 of ball 32.

Figure 2:
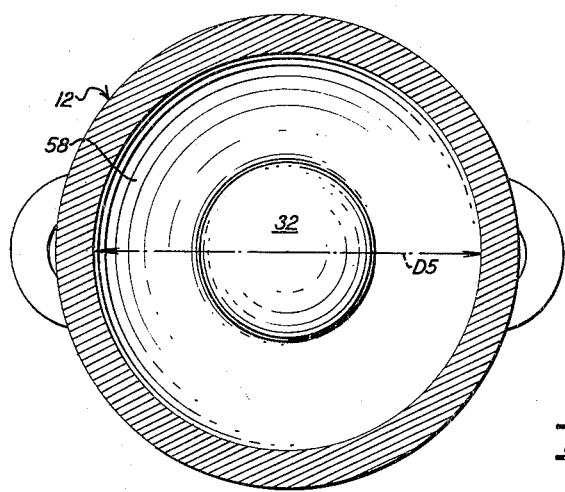
FIG. 2 is a sectional view along line II—II with the associated ball elevated to the level of the cross-sectional line.

With ball 32 displaced upwardly to a substantially central location in chamber 46, section 12 and ball 32 cooperatively define an annular chamber 58. The cross-sectional area of annular passage 58, as indicated in FIG. 2, is preferably about 4.5 to 5.0 times the maximum cross-sectional area of ball 32.

With the relative dimensions indicated above, it has been found that with water constituting the fluid being controlled, an inlet pressure of 40 pounds per square inch and a flow of 50 gallons per minute will keep a 1⅜ inch diameter chrome steel ball suspended centrally of chamber 46. The pressure and flow rate are, however, not critical by reason of the fact that the tapering of chamber 46 into outlet conduit 48 provide reactive forces acting downwardly against ball 32 so as to maintain the same centrally located. Other fluid conditions which are exemplary and not limited are as follows:

50 pounds per square inch at a flow rate of 54 gallons per minute;
60 pounds per square inch at a flow rate of 55 gallons per minute;
70 pounds per square inch at a flow rate of 60 gallons per minute; and 85 pounds per square inch at a flow rate of 64 gallons per minute.

In actual practice, however, the fluid will, of course, not be restricted to water and the valves are used with alcohol having a specific gravity of .71 and sulfuric acid having a specific gravity of 1.5, as well as with more viscous fluids of, for example, the oil family. In operation the fluid will move vertically upwards through inlet conduit 16 and will displace ball 32 upwardly from seat 30. The fluid will flow around ball 32 via annular passage 58 and will leave the valve via outlet conduit 48. It has been found that the movement of the fluid through annular passage 58 causes ball 32 to rotate whereby an adherence of foreign particles and matter to the ball is prevented. It has also been found that the ball 32 is maintained in a substantially centralized position so that the need of a guide member or the like is avoided, so that the valve of the invention reduces to an extremely simple construction requiring no maintenance or parts replacement operations.

When the pressure is sufficient to raise the ball 32 from seat 30, fluid flow through the valve results. Flow in the reverse direction (i.e., downwardly) is prevented since diameter D3 is greater than diameter D2. Fluid flow at extremely great pressures may be prevented by ball 32 blocking outlet conduit 48. Ball 32 always returns to its proper position by reason of the tapered configuration of seat 30.

In the event that a cleaning operation ultimately becomes necessary, this is facilitated by the division of valve 10 into sections 12 and 14.

The valve is, of course, intended to be mounted in vertical position and has been found especially suited for use with centrifugal pumps.

There will now be obvious to those skilled in the art many modifications and variations of the structure set forth. These modifications and variations will, however, lie within the scope of the invention as they are defined by the following claims.

What is claimed is:

1. A ball check valve for a liquid comprising a lower valve section defining a vertical inlet passage and a spherical seat atop said passage with a conical periphery flaring upwardly therefrom, a metal ball heavier than said liquid guided under the influence of gravity downwardly into said seat whereat the ball blocks said inlet passage, and a separate upper valve section defining a spherical chamber of circular cross-section, said chamber having a maximum diameter of about 2¼ to 2¾ times the diameter of said ball, the chamber being adapted to merge with said seat with said valve sections juxtaposed, said chamber narrowing upwardly into a circular seat adapted for receiving said ball and forming a seal therewith, said chamber cooperating with said ball so that said ball is freely suspended in said chamber under the action of the upward flow of the medium through the passage, said ball being displaced upwardly into said circular seat to terminate said flow with the flow exceeding a predetermined maximum rate, said upper section defining an outlet conduit opening upwardly from the latter said seat, and means for engaging said sections with said passages, chamber and seats disposed symmetrically about a common axis.

2. A valve as claimed in claim 1 wherein said vertical inlet passage of the lower valve section has a circular cross section extending downwardly from said seat, the latter passage having a diameter which is less than that of the ball, said inlet passage being further constituted by a portion of cylindrical shape and an outwardly flaring portion above said cylindrical portion and in communication with the circular passage, said cylindrical portion having a diameter which is independent of the diameter of the circular cross section.

References Cited in the file of this patent

UNITED STATES PATENTS

| | | |
|---|---|---|
| 460,671 | Anthony | Oct. 6, 1891 |
| 1,265,365 | Parish | May 7, 1918 |
| 1,609,580 | Sinclair | Dec. 7, 1926 |
| 1,898,303 | Hunt | Feb. 21, 1933 |
| 2,808,580 | Fuller | May 28, 1956 |

FOREIGN PATENTS

| | | |
|---|---|---|
| 405,385 | Great Britain | Feb. 8, 1934 |